United States Patent

Rieger et al.

[11] 4,416,318
[45] Nov. 22, 1983

[54] ANTI-SKID CHAIN AND MAKING THEREOF

[75] Inventors: Hansjörg Rieger, Aalen; Dietmar H. Holzwarth, Schwäbisch Gmünd, both of Fed. Rep. of Germany

[73] Assignee: RUD-Kettenfabrik Rieger & Dietz GmbH u. Co., Aalen, Fed. Rep. of Germany

[21] Appl. No.: 358,451

[22] Filed: Mar. 15, 1982

[30] Foreign Application Priority Data

Mar. 17, 1981 [DE] Fed. Rep. of Germany ....... 3111271
Mar. 17, 1981 [DE] Fed. Rep. of Germany ... 8108431[U]

[51] Int. Cl.³ .................. B60C 27/00; B21D 39/00; B21F 15/02
[52] U.S. Cl. ..................... 152/213 A; 24/68 TT; 24/299; 29/517; 152/219; 152/242
[58] Field of Search ............... 152/239, 240, 241, 242, 152/243, 244, 213 R, 213 A, 216, 217, 219, 220, 221, 231, 172, 177, 179, 184, 187, 189, 191; 24/116 R, 299, 68 BT, 68 CT, 68 TT, 70 T, 70 CT, 70 TT; 81/15.8; 140/111; 59/1, 9; 29/517

[56] References Cited

U.S. PATENT DOCUMENTS

| | | | |
|---|---|---|---|
| 2,433,567 | 12/1947 | Lofgren et al. | 152/233 |
| 2,767,760 | 10/1956 | Granger | 152/242 X |
| 3,762,457 | 10/1973 | Guethle | 152/239 |
| 3,884,283 | 5/1975 | Engel | 152/241 X |
| 3,893,499 | 7/1975 | Von Der Hellen | 152/241 X |
| 4,146,075 | 3/1979 | Riedel | 152/213 A X |

Primary Examiner—William A. Powell
Assistant Examiner—Thomas Bokan
Attorney, Agent, or Firm—Parmelee, Bollinger & Bramblett

[57] ABSTRACT

In an anti-skid chain with an inner retaining device (1) formed by a resilient steel hoop, a tensioning strand (6) bridging end parts (4, 5) of the steel hoop is used for tensioning and is guided over the tread of the tire to the outer retaining device (3). The deflection device (13), which deflects the tensioning strand (6) out of the region of the inner retaining device (1) to the tread, is held at a distance from the end parts (4, 5) of the inner retaining device (1) by movable connecting elements, especially chain links.

23 Claims, 12 Drawing Figures

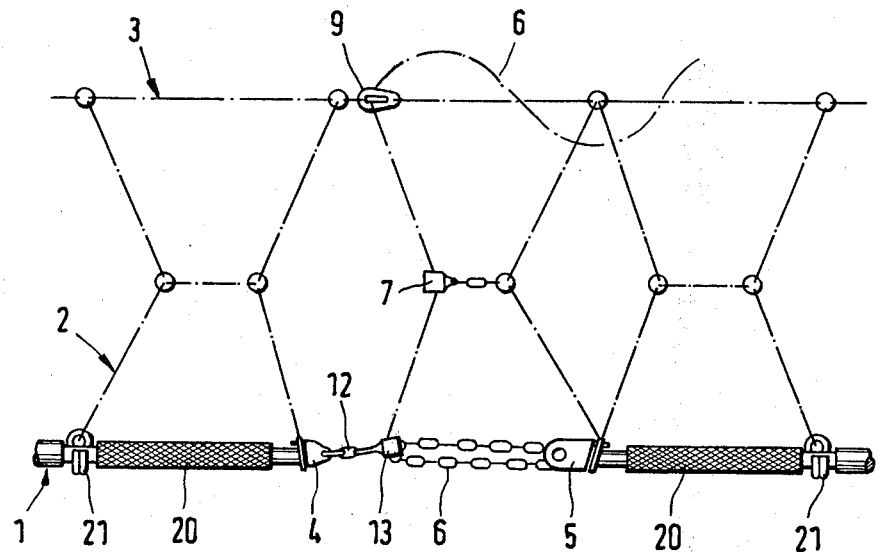
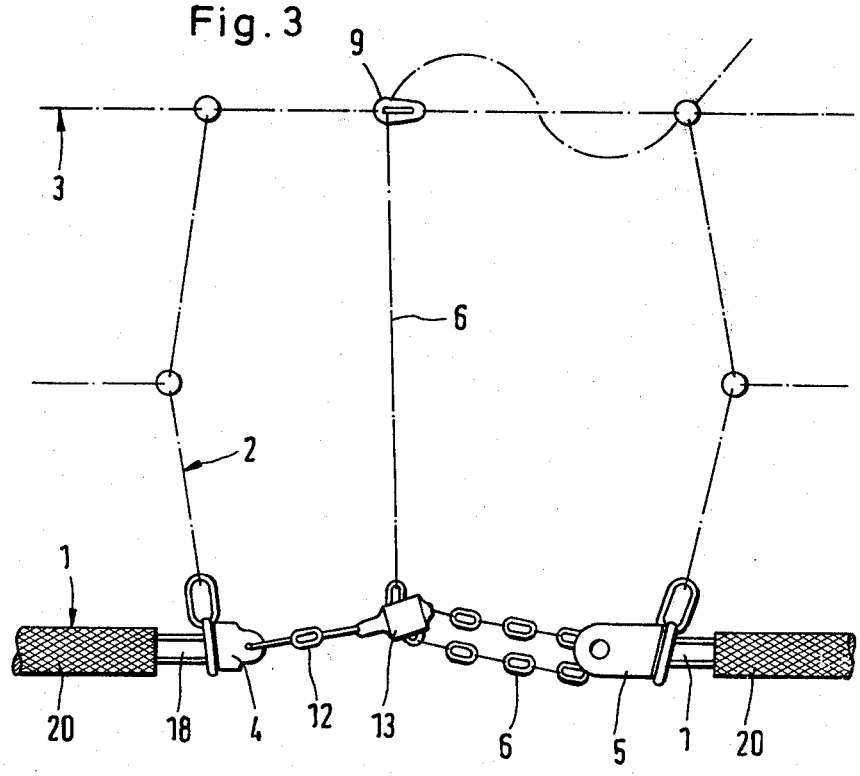

ANTI-SKID CHAIN AND MAKING THEREOF

BACKGROUND OF THE INVENTION

The invention relates to an anti-skid chain for vehicle tyres, with a retaining device, which, when the chain is assembled, comes to rest respectively against the inner side and the outer side of the tyre, for chain-strand lengths extending over the tread, in which chain a tensioning strand serves for tensioning the inner retaining device which can be slipped over the tyre and which has a certain natural rigidity, which tensioning strand bridges a gap between the ends of the inner retaining device and the free end of which, after being deflected at least once, is guided over the tread of the tyre to the outer retaining device.

In comparison with anti-skid chains with inner and outer retaining devices formed by side chains and collapsing into one another when dismantled, anti-skid chains of the type mentioned above offer the advantage that they are easier to assemble and that there is practically no need for occasionally complicated disentanglement of the chain network before assembly.

In a known anti-skid chain of the abovementioned type, the tensioning strand is deflected to the tread of the tyre by means of a lug connected fixedly to the end of an elastic hoop forming the inner retaining device (German Offenlegungsschrift No. 2,556,115). Practice has taught that in the case of such a chain there is no guarantee that, when the chains are tensioned, the hoop ends maintain a sufficiently long distance from the tread of the tyre. On the contrary, there is a danger that, when the chain is tensioned, the hoop end having the deflection lug will be pulled outwards away from the wheel axis, that is to say into the tread region, where it can not only be damaged itself but can also cause damage to the vehicle.

The danger indicated, which has hitherto prevented the introduction of known anti-skid chains of the type in question, cannot be eliminated even by using, according to an older proposal, instead of a deflection lug connected fixedly to the end of the inner retaining device a deflection lug suspended in a lug located at the end of a hoop-shaped retaining device. Although by replacing a deflection lug with a deflection sleeve it becomes easier to tighten the tensioning chain and, especially during assembly, the danger of chain-strand lengths becoming hooked to the rearside of the tyre is reduced, nevertheless, the use of the older anti-skid chain mentioned likewise cannot give full satisfaction.

SUMMARY OF THE INVENTION

The object on which the invention is based is to provide an anti-skid chain of the type in question, which guarantees that, both during assembly, that is to say during tightening of the tensioning strand, and during subsequent running of the vehicle, the ends of the inner retaining device preferably formed by a steel hoop do not travel outwards into the tread region, but remain in the safe region of the tyre flanks.

This object is achieved, according to the invention, due to the fact that the deflection device guiding the tensioning strand out of the region of the inner retaining device to the tread is held at a distance from end parts of the inner retaining device by connecting elements movable relative to the inner retaining device.

The anti-skid chain according to the invention offers the advantage that, for the first time, it allows the reliable use of an anti-skid chain provided with an integrated elastic assembly hoop, the hoop aperture of which can be closed, and kept closed, by means of a tensioning strand which can be actuated from the front side of a wheel. Because of the distance maintained between the deflection device and the end parts and because of the improved conditions of force resulting from this, the hoop essentially retains its shape and position, that is to say, in the tensioned state, it extends over its entyre length essentially concentrically to the wheel axis.

An especially advantageous embodiment proves to be one in which the inner retaining device is formed by a resilient steel hoop and in which the tensioning strand, before passing the deflection device guiding it to the tread and connected to one end of the steel hoop via at least one connecting element, is guided by a further deflection device fastened to the other end of the steel hoop.

BRIEF DESCRIPTION OF THE DRAWINGS

Further details and features of the invention emerge from the sub-claims and from the following description of exemplary embodiments illustrated in the more or less diagrammatic drawing in which:

FIG. 2 shows a developed plan view of the tensioning point of an anti-skid chain which largely corresponds to the anti-skid chain according to FIG. 1;

FIG. 3 shows a developed plan view of the tensioning point of a modified anti-skid chain;

DISCUSSION OF THE PREFERRED EMBODIMENT

Figure 1:
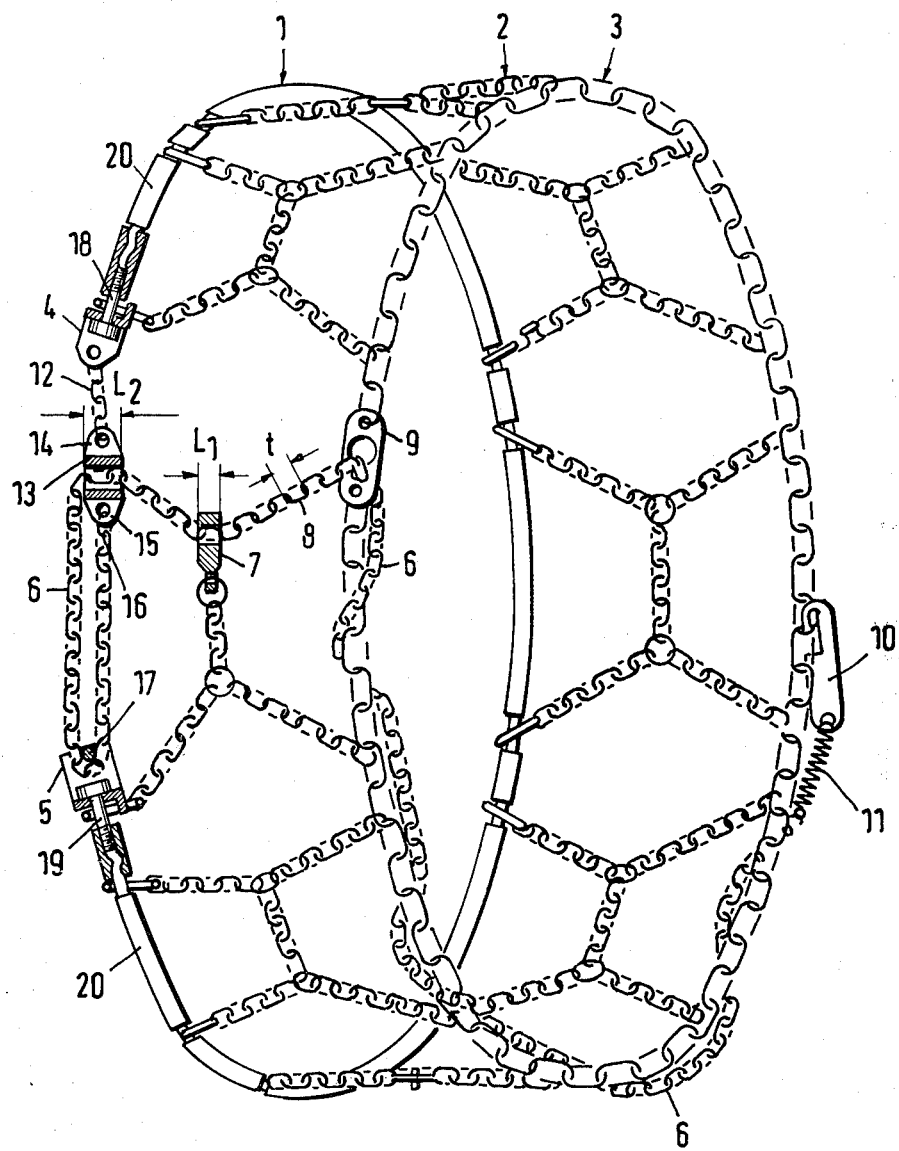
FIG. 1 shows a perspective view of a first anti-skid chain.

In the anti-skid chain illustrated in FIG. 1, 1 denotes the inner retaining device for the chain network 2 of an anti-skid chain, the outer retaining device 3 of which is formed by a continuous closed side chain. The inner retaining device 1 consists of a resilient steel hoop provided with end parts 4 and 5 which are at a distance from one another of the order of 10 to 25% of the length of the steel hoop. The end parts 4 and 5 of the inner retaining device 1 are bridged by a tensioning strand 6 which consists of a chain and which is guided transversely over the tread from the inner retaining device 1 to the outer retaining device 3, in the course of which it passes through a sliding sleeve 7 in the region of the tread. The length $L_1$ of this sliding sleeve is greater than the difference between the pitch t of the links 8 of the tensioning strand and the link-wire diameter d of these links. 9 denotes a blocking element with an essentially keyhole-shape pull-through orifice, by means of which the position of the tensioning strand 6 on the outer retaining device 3 can be locked. The surplus end of the tensioning strand 6 is, as shown in FIG. 1, looped round the outer retaining device, and finally the free end of the tensioning strand is anchored at a suitable point on the outer retaining device by means of a securing hook 10. Located between the securing hook 10 and the remaining part of the tensioning strand is an elastic intermediate piece 11 which counteracts undesirable loosening of the secured end of the tensioning strand.

The end parts 4 and 5 are mounted rotatably through 360° on the inner retaining device 1. Because it is fully rotatable, it is possible to reverse the chain network. A deflection device 13 formed by a sliding sleeve is connected to the end part 4 via at least one connecting element 12 movable relative to the inner retaining device 1. In this case also, the length $L_2$ is greater than the difference between the pitch t of the links 8 of the tensioning strand 6 and the link-wire diameter d of these links. For this purpose, the deflection device 13 is provided with a connection lug 14 in which is suspended a connecting element 12 formed by a chain strand. The deflection device 13 also has a connection lug 15 in which is suspended the tensioning strand end 16 facing away from the free end of the tensioning strand 6. The tensioning strand 6 extends from the connection lug 15 of the deflection device 13 to the end part 5. There, it is deflected by a second deflection device 17 formed by a roller or a pin and is guided back to the deflection device 13, from which it extends via the tread network to the outer retaining device 3. In other words, the deflection device 13 is held at a distance from the end parts 4 and 5 of the inner retaining device 1, on the one hand, by the connecting element 12 and, on the other hand, by parts of the tensioning strand 6. It is important to maintain such a distance to ensure the perfect functioning of the anti-skid chain according to the invention. The reason for this is that the "spacers" can change their position relative to the inner retaining device 1 formed by a resilient steel hoop and, when the tensioning strand 6 is actuated, are guided into a position from which lower radial forces are exerted by the deflection device 13 on the end parts 4 and 5 than when the deflection device 13 is connected directly to one end of the inner retaining device.

Whereas the end part 4 is formed by a rotatable web, the end part 5 consists of a rotatable housing for a roller forming the deflection device 17. The end parts 4 and 5 are mounted on pins 18 and 19 which, at the same time, form connection elements for chain-strand lengths of the chain network 2 which extend over the tread.

To define the points of connection of the chain-strand lengths of the chain network 2 to the inner retaining device, spacers 20 made of plastic are located on the inner retaining device. These spacers can be formed by tubular lengths of plastic, but it is also possible to injection-mould them directly onto the steel hoop forming the inner retaining device.

FIG. 2 shows a plan view of the tensioning point of a corresponding anti-skid chain very similar to the anti-skid chain according to FIG. 1. The same reference numerals have been used for parts corresponding to parts of the anti-skid chain according to FIG. 1. Whereas, in the exemplary embodiment described first, the tread network was connected to the inner retaining device via chain links, in the exemplary embodiment according to FIG. 2 hook members 21 have been used for connecting the chain network 2 to the inner retaining device 1.

FIG. 3 shows a tensioning point where the tensioning strand 6 is not an organic part of the configuration of the tread network and does not pass through a sliding sleeve in the region of the tread.

Figure 4:
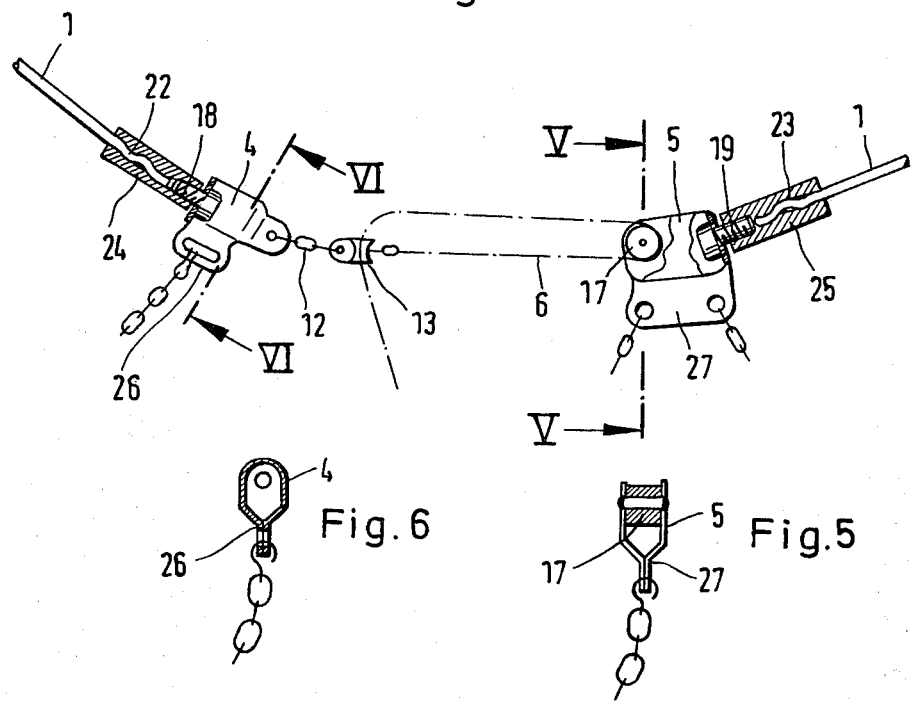
FIG. 4 shows a detail of a tensioning point with modified end parts.
Figure 6:
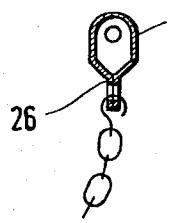
FIG. 6 shows a section along the line VI—VI in FIG. 4.
Figure 5:
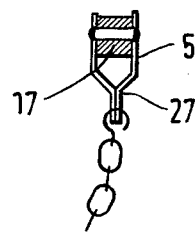
FIG. 5 shows a section along the line V—V in FIG. 4.

FIG. 4 indicates how end parts 4 and 5 of a modified design are mounted rotatably on the remaining part of the inner retaining device. The steel hoop forming the inner retaining device 1 is given a corrugated formation at its ends 22 and 23, and on it is pressed a sleeve 24 and 25 respectively which carries a pin 18 and 19 respectively for the end parts 4 and 5. 26 and 27 denote appendages which form connection lugs for chain strands of the chain network.

Figure 7:
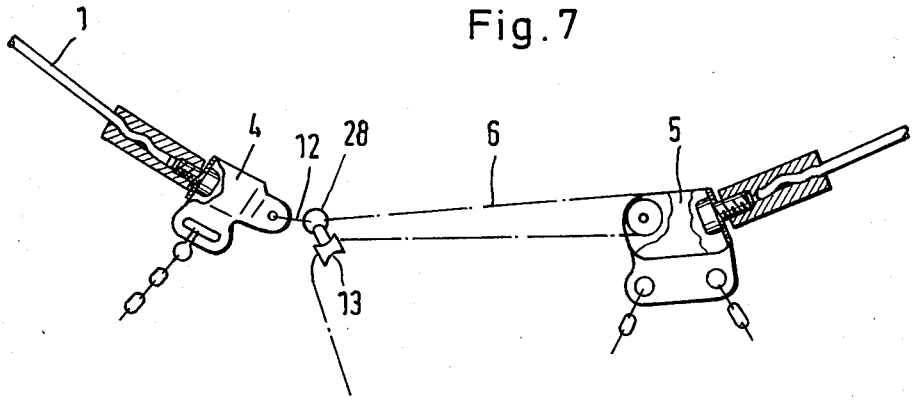
FIG. 7 shows a further tensioning point.

Whereas, in the exemplary embodiments described previously, the end facing away from the free end of the tensioning strand 6 is connected directly to the deflection device 13, FIG. 7 shows an exemplary embodiment in which the end of the tensioning strand 6 is suspended in a chain link 28 which also serves for connecting the end part 4 of the inner retaining device 1 to the deflection device 13 formed by a sliding sleeve, specifically with a further connecting element 12 formed by a chain link being interposed.

Figure 8:
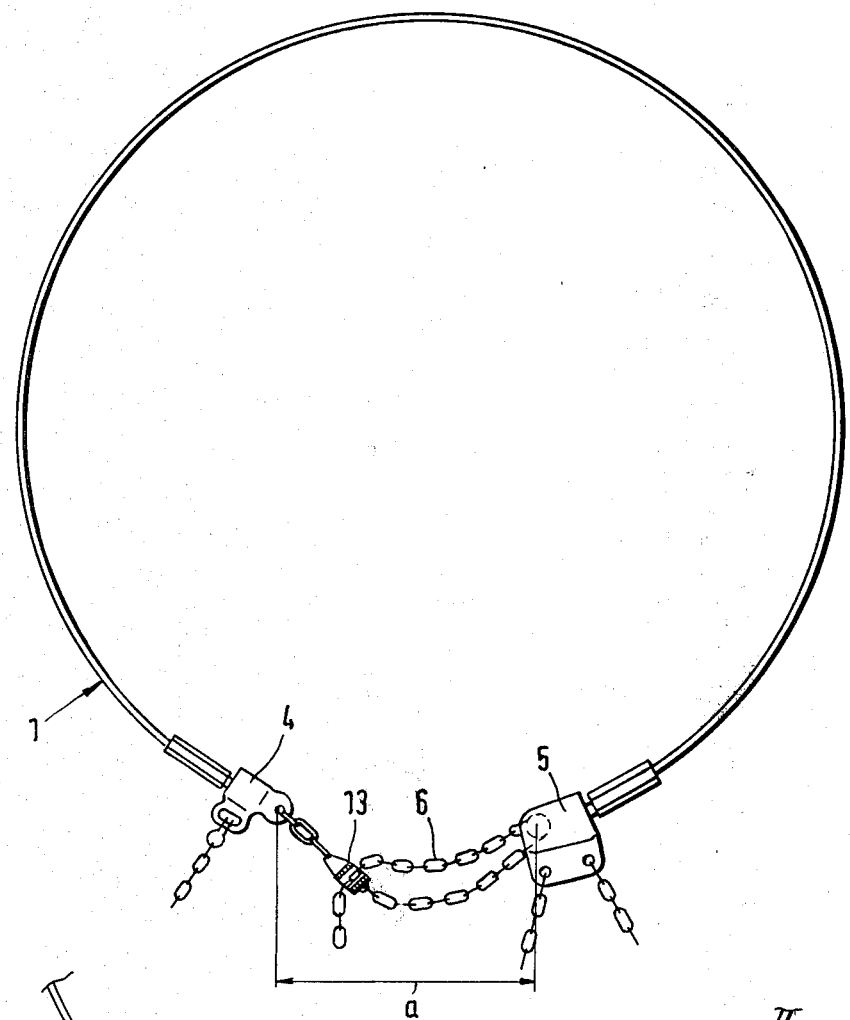
FIG. 8 shows, on a reduced scale, the tensioning point according to FIG. 4 in the non-tensioned state.
Figure 9:
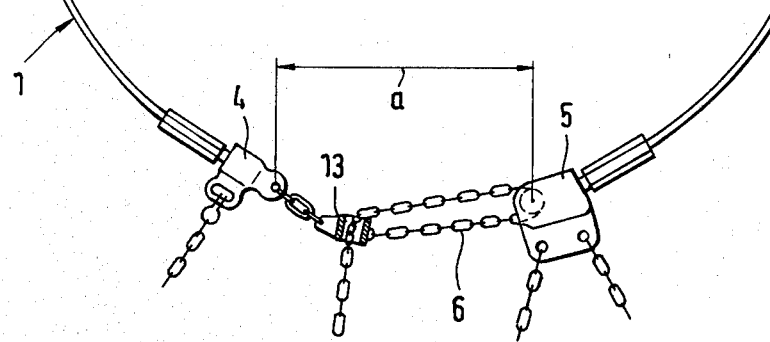
FIG. 9 shows the tensioning point according to FIG. 8 in the tensioned state.

FIGS. 8 and 9 are intended merely to illustrate that the distance between the end parts 4 and 5 of the inner retaining device 1 remains essentially the same both in the tensioned state and in the non-tensioned state of the tensioning strand 6, this being indicated by the value a in the Figures. It can also be seen clearly that the deflection device 13 assumes the function of a spacer for the lengths of the tensioning strand 6 which run next to one another.

Figure 10:
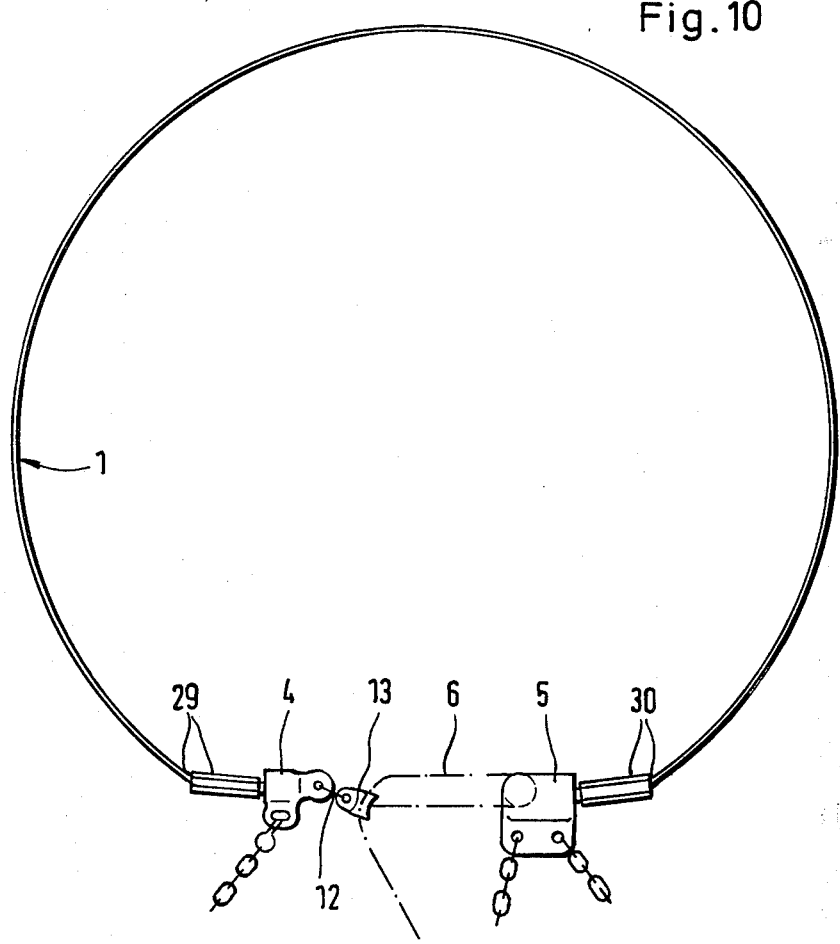
FIG. 10 shows a modified tensioning point.

FIG. 10 illustrates a tensioning point where an inner retaining device 1 having in the vicinity of its end parts 4 and 5 portions 29 and 30 curved or angled towards the wheel axis is used.

Figure 11:
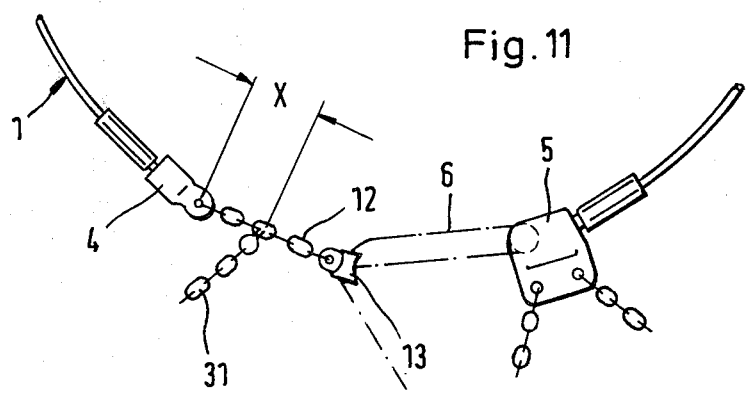
FIG. 11 shows the tensioning point of a steel hoop with ends curved towards the hoop centre.

In previous constructions, chain-strand lengths of the tread network engage on the ends of the inner retaining device. In contrast to this, FIG. 11 shows a solution in which a chain-strand length 31 engages between the end part 4 and the end part 5 on a connecting element 12 formed by a chain-strand length, that is to say at a distance X from the end point 4.

In the constructions illustrated hitherto, the deflection device 13 assigned to the end part 4 of the inner retaining device 1 is always formed by a sliding sleeve, the structure of which largely corresponds to that of the sliding sleeve 7 in the region of the tread network. The advantage in using a sliding sleeve of this type is that a deflection device of very flat construction is obtained. The flat design is achieved especially because the sliding sleeve has an essentially cross-shaped guide channel, the axes of which are arranged at an angle of approximately 45° to the tyre surface. However, instead of a sliding sleeve, it is also possible to use a ring or a roller for the deflection device guiding the tensioning strand to the tread.

Figure 12:
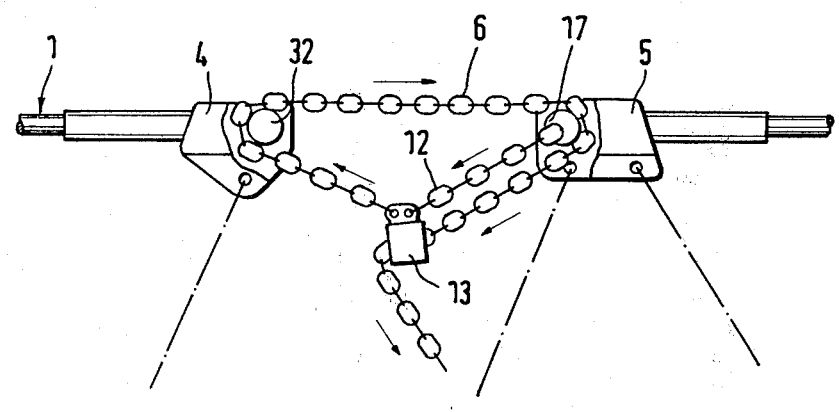
FIG. 12 shows a tensioning point with a triple deflection of the tensioning strand.

FIG. 12 shows a tensioning point where the tensioning strand 6 is deflected not twice, as in the constructions previously described, but three times. For this purpose, not only is the end part 5 provided with a roller or a pin 17, but the end part 4 also has a roller or a pin 32.

We claim:

1. Anti-skid chain for vehicle tyres, said chain having retaining means including an inner retaining device and an outer retaining device, which, when the chain is assembled, come to rest respectively against the inner side and the outer side of the tyre, said retaining devices serving to retain chain-strand lengths extending over the tread, said inner retaining device comprising a resilient arcuate member adapted to be resiliently slipped over the tire and a chain tensioning strand for tensioning said arcuate member and bridging a gap between the ends of said arcuate member, said chain tensioning strand having at least one free end which, after being deflected at least once by a deflection device, is guided over the tread of the tyre to the outer retaining device, said deflection device (13) guiding the tensioning strand (6) out of the region of the inner retaining device (1) to the tread is held at a distance from end parts (4, 5) of the inner retaining device (1) by connecting elements (6, 12) movable relative to the inner retaining device (1).

2. Anti-skid chain according to claim 1, characterised in that the end parts (4, 5) are mounted rotatably through 360° at the ends of the inner retaining device (1).

3. Anti-skid chain according to claim 2, characterised in that the connecting elements (6, 12) are chain-links or chain-strand lengths.

4. Anti-skid chain according to claim 3, characterised in that at least one connecting element holding the deflection device (13) at a distance from an end part is formed by a part of the tensioning strand (6).

5. Anti-skid chain according to claim 2, characterised in that the inner retaining device (1) is provided with spacers (20) made of plastic which define connection points for the chain-strand portions extending over the tread.

6. Anti-skid chain according to claim 5, characterised in that the steel hoop is curved or angled towards the hoop centre in the region of its ends (FIG. 10).

7. Anti-skid chain according to claim 2, characterised in that the deflection device (13) guiding the tensioning strand (6) out of the region of the inner retaining device (1) to the tread is connected to one end part (4) of the inner retaining device (1) via at least one connecting element (12), and the tensioning-strand end (16) facing away from the free end of the tensioning strand (6) is fastened to the deflection device (13).

8. Anti-skid chain according to claim 7, characterised in that the deflection device (13) is formed by a sliding sleeve provided with two connection lugs (14, 15) for chain links.

9. Anti-skid chain according to claim 2, characterised in that the deflection device (13) guiding the tensioning strand (6) out of the region of the inner retaining device (1) to the tread is connected to one end part (4) of the inner retaining device (1) via connecting elements (12, 28) which form a prolongation of the tensioning-strand end (16) facing away from the free end of the tensioning strand (6) (FIG. 7).

10. Anti-skid chain according to claim 2, characterised in that the tensioning strand (6), before passing the deflection device (13) guiding it to the tread and connected to one end part (4) of the inner retaining device (1) via at least one connecting element (12) is guided by a further deflection device (17) fastened to the other end part (5) of the inner retaining device (1).

11. Anti-skid chain according to claim 10, characterised in that the two end parts (4, 5) are provided with additional deflection devices (17, 32) for the tensioning strand (6).

12. Anti-skid chain according to claim 11, characterised in that the further deflection devices (17, 32) are each located in a housing which is formed by the end parts (4, 5).

13. Anti-skid chain according to claim 12, characterised in that the further deflection devices (17, 32) are each formed by a roller.

14. Anti-skid chain according to claim 2, characterised in that the end parts (4, 5) of the inner retaining device (1) are mounted rotatably on pins (18, 19) which form retaining devices for connection elements of chain-strand lengths extending over the tread.

15. Anti-skid chain according to claim 2, characterised in that the outer retaining device (3) is made endless and can be transferred into a tensioning position via the chain-strand lengths of the tread network (2) by means of the inner retaining device (1).

16. Anti-skid chain according to claim 2, characterised in that the chain network (2) is connected to the inner retaining device (1) via hook members (21).

17. Anti-skid chain according to claim 1, characterised in that the deflection device (13) guiding the tensioning strand (6) to the tread is formed by a sliding sleeve, the length L of which is greater than the difference between the pitch t and the link-wire diameter d of the links of a tensioning chain forming the tensioning strand (6).

18. Anti-skid chain according to claim 1, characterised in that the deflection device (13) guiding the tensioning strand (6) to the tread forms a spacer for lengths of the tensioning strand (6) which run next to one another.

19. Anti-skid chain according to one of claims 1 or 2, characterised in that the resilient steel hoop forming the inner retaining device (1) has in its initial position a radius of curvature which is 70 to 85% of half the tyre diameter.

20. Anti-skid chain according to claim 19, characterised in that the distance between the end parts (4, 5) of the steel hoop is approximately 10 to 25% of the length of the steel hoop.

21. Anti-skid chain according to claim 1, characterised in that the tensioning strand (6) can be locked on the outer retaining device (3).

22. Anti-skid chain according to claim 21, characterised in that an elastic intermediate piece (11) is located between a securing hook (10) located at the end of the tensioning strand (6) and a blocking element (9) for the tensioning strand (6).

23. Process for producing an anti-skid chain according to claim 1, characterised by attaching the end parts (4, 5) to the inner retaining device (1) consisting of elastic spring-steel wire, after the ends of the inner retaining device (1) have previously been given a corrugated deformation.

* * * * *